United States Patent [19]

Groos

[11] Patent Number: 4,896,590
[45] Date of Patent: Jan. 30, 1990

[54] RAILROAD HOPPER CAR VENT

[75] Inventor: William J. Groos, Tinley Park, Ill.

[73] Assignee: Pullman Leasing Company, Chicago, Ill.

[21] Appl. No.: 327,048

[22] Filed: Mar. 22, 1989

[51] Int. Cl.$^4$ ............................................. B60H 3/06
[52] U.S. Cl. ........................................ 98/6; 55/385.4;
55/502; 55/504; 98/52
[58] Field of Search .................... 55/385.4, 385.6, 493,
55/502, 504; 98/6, 37, 52

[56] References Cited

U.S. PATENT DOCUMENTS

| | | | |
|---|---|---|---|
| 1,108,094 | 8/1914 | Ferguson | 55/504 X |
| 3,611,905 | 10/1971 | Brinks | 98/6 |
| 3,834,577 | 9/1974 | Tempero | 98/37 X |
| 3,892,169 | 7/1975 | Jarnot | 98/37 |
| 4,441,404 | 4/1984 | Simon | 98/96 |
| 4,537,119 | 8/1985 | Jarnot | 98/6 |
| 4,594,082 | 6/1986 | Catherwood, Sr. | 55/316 |
| 4,675,034 | 6/1987 | Lynch et al. | 55/504 X |

FOREIGN PATENT DOCUMENTS 21494194  6/1985  United Kingdom .................... 98/37

*Primary Examiner*—Harold Joyce

[57] ABSTRACT

The invention is directed to a venting device for admitting air into an enclosed container such as a railway car during discharge of material from the container. The device includes a securing member having an interlock for releasably retaining a replaceable filter member that is adapted to admit air into the container. The mounting member is adapted for mounting in an opening in the container member. A securing member has a one way interlook with the mounting member which may be overridden for disassembly and a releasable interlock with the filter member.

20 Claims, 5 Drawing Sheets

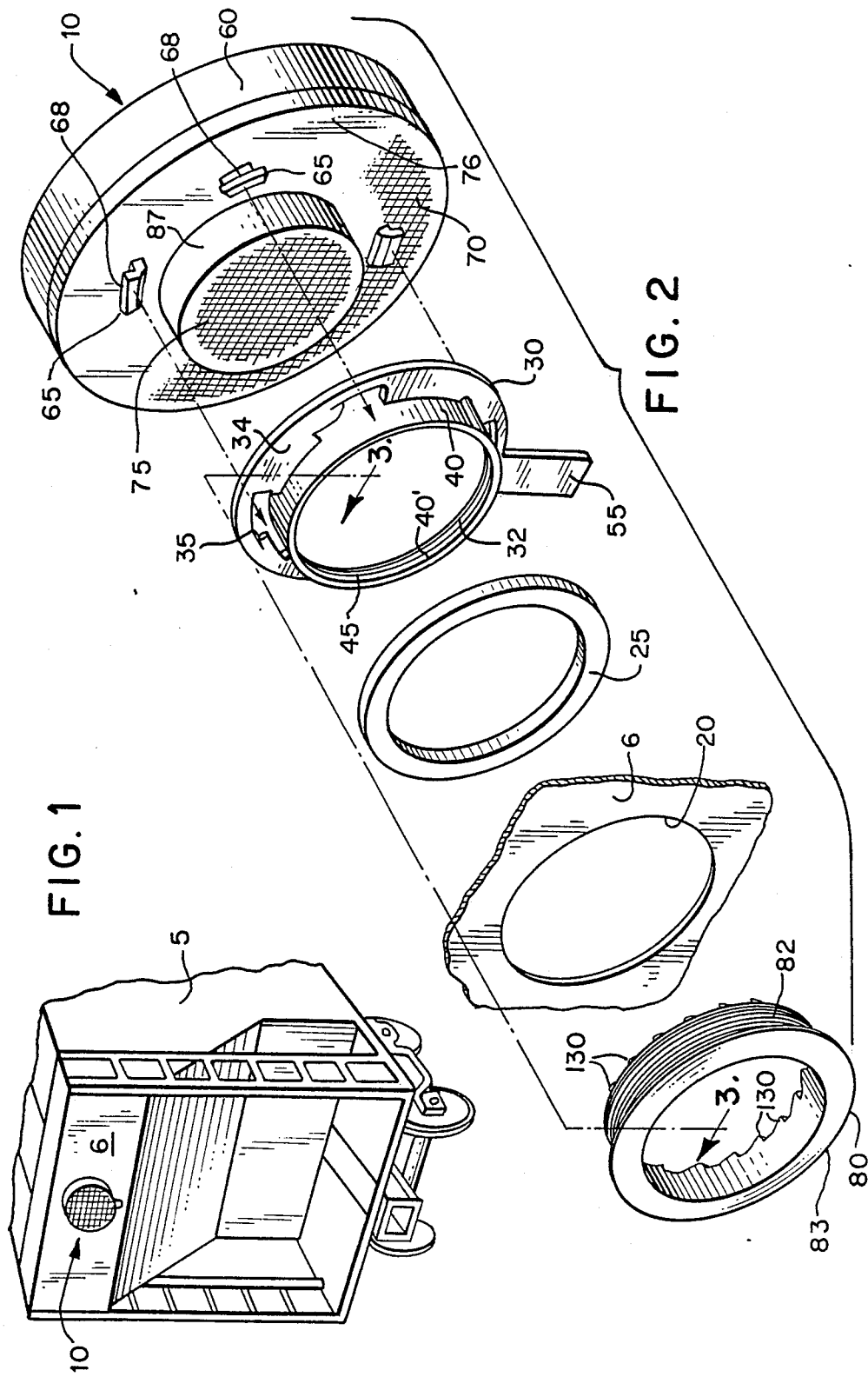

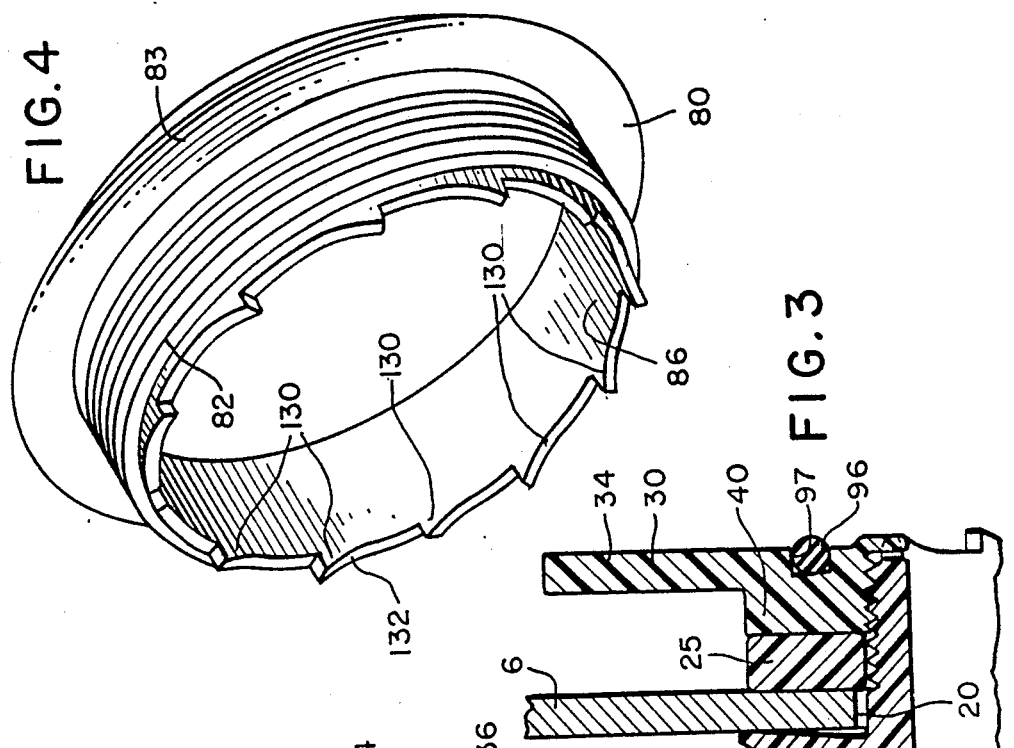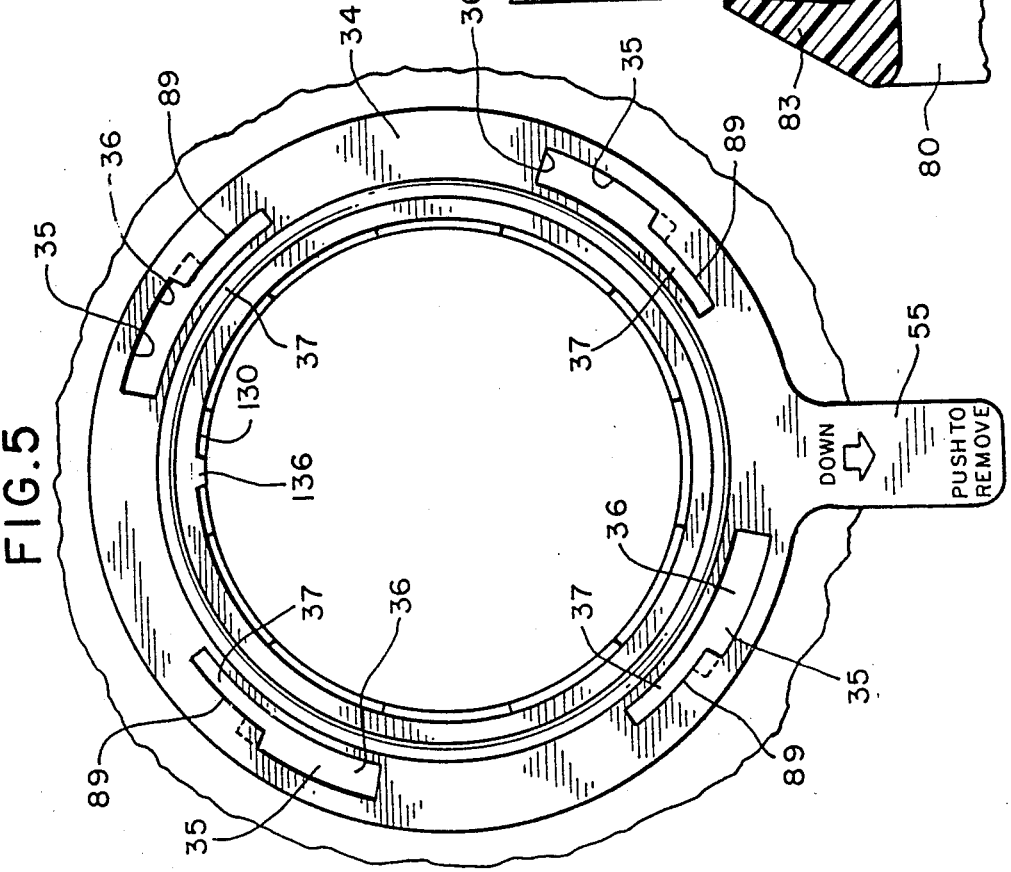

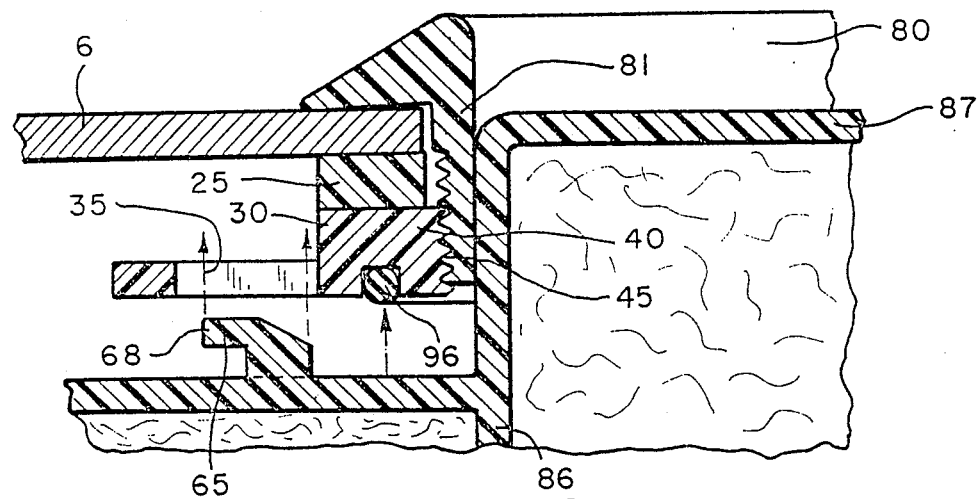
FIG. 8
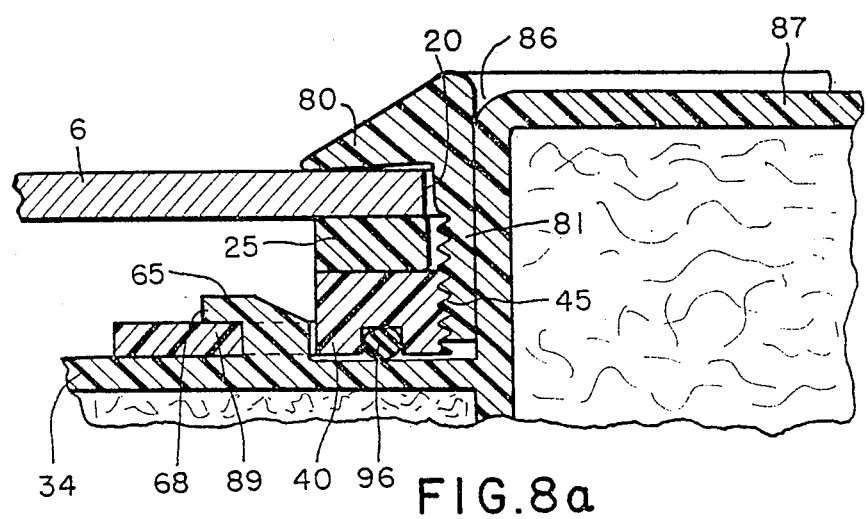
FIG. 8a
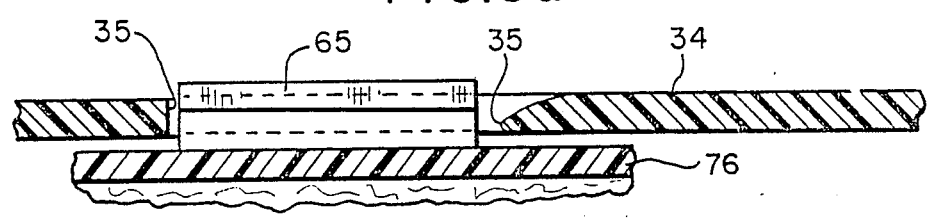
FIG. 9
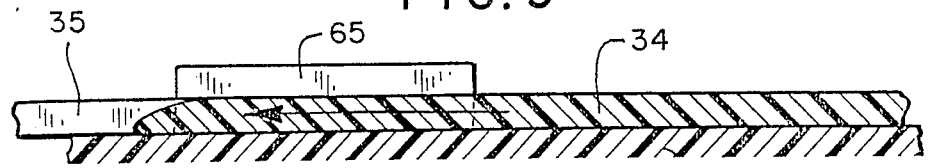

RAILROAD HOPPER CAR VENT

FIELD OF THE INVENTION

This invention generally relates to the field of venting devices for enclosed containers. In particular, the invention relates to venting devices for railroad hopper cars.

BACKGROUND OF THE INVENTION

Railroad cars having enclosed hoppers are routinely employed to transport lading. During discharge of the lading from the enclosed hopper, the air pressure within the cavity of the hopper may become substantially less than that of the atmosphere. The resulting difference in air pressure between the atmosphere and the interior of the cavity may be sufficient to cause structural failure of the railroad car or inhibit discharge of the lading.

The problem of a differential air pressure between the hopper cavity and the atmosphere has been addressed by use of venting devices that admit air into an enclosed cavity. Venting devices that have been employed in the prior art include that of U.S. Pat. No. 3,112,687 to Henneberger. Henneberger shows a ventilator that includes an integral base member that has a sleeve thereon. The sleeve fits into an opening on the surface of the deck of an enclosure. The sleeve has a peripheral flange which provides a lower baffle that is integral and co-axial with the sleeve and which is provided at its underside with radially spaced, downwardly extending ribs between which are grooves for receiving a sealant material. The base member is secured to a portion of the deck surrounding the hole by screws through a flange.

Another type of ventilator device is shown in U.S. Pat. No. 4,537,119 to Jarnot. Jarnot shows a ventilator that includes an annular base which has a central opening therein. The bottom surface of the base has an adhesive layer for mounting the base to a selected surface. The upper surface of the base has diametrically opposed flanges for engaging flanges disposed on the vent cover.

An additional example of prior art devices is shown in U.S. Pat. No. 4,315,579 to Martin. Martin is directed to a venting system for liquid storage tanks. The system includes a closure assembly that includes an upstanding wall which defines a vertical passageway that extends through the closer assembly. A sheet of filter material is seated across the opening of the vertical passageway. A dome shaped cover member is pivotally secured to the closure assembly to facilitate replacement of the filter material.

A further example of venting systems is shown in U.S. Pat. No. 3,515,051 to Pulcrano. Pulcrano shows a side plate structure conduit for venting of covered hopper cars. The side plate structure forms a conduit that extends along the length of the upper portion of each side of the hopper car. Air inlets are provided with respect to the leading end of the car. Openings in the side plate structure of the car communicate with the interior of the car to supply air thereto. Air is exhausted from the car by openings in the side plate of the car that communicate between the hopper and the atmosphere.

Venting systems for railroad cars are also shown in U.S. Pat. No. 3,611,905 to Brinks. Brinks shows a venting device attached about an opening in the roof of a hopper car to permit air to enter the interior of the car during unloading. The device has a horizontal portion overlying the roof and a vertical depending portion disposed over the end wall in spaced relation thereto. Replaceable screening and filtering members are included with the vent arrangement to prevent entry of foreign objects into the cavity during discharge.

The venting devices of the prior art function to admit air into an enclosed chamber. These devices, however, tend to be complex in construction. A need therefore exists for a venting device which functions to admit air into the interior of a railroad car during discharge without the complexities of the prior art devices.

SUMMARY OF THE INVENTION

The invention is directed to a venting device for admitting air into an enclosed container during discharge of material there from having means for releasable retaining a replaceable member that is adapted to admit air into the container. The receiving member is adapted for mounting in an opening in the container member. A securing member having a means for retaining the receiving member in the opening is included in the venting device. The securing member can be in the form of a hollow ring having an outwardly projecting flange section for engaging lateral surfaces of the container.

The receiving member can include openings such as variable width slots for releasably retaining projections provided on the replaceable member. The receiving member may be retained in the opening of the container by a threaded male section of the securing member adapted to engage a threaded portion of the receiving member.

The replaceable member may be in the form of a porous filter preferably filled with filter material for transmitting air through the venting device. Alternatively, the replaceable member may be in the form of a plug which can be easily removed from the device and operable to admit air into the interior of the container. Suitable material for the filter include filter paper, screens polyester foam.

The venting device also includes sealing means for forming a seal between components and the container. These sealing means may include vinyl gaskets and O-rings and the other portions of the device a preferably made of actuate butyl styrene an FDA approved material.

BRIEF DESCRIPTION OF THE DRAWINGS

FIG. 1 is a partial perspective view of a railway hopper car showing the venting device mounted on an end section of the hopper.

FIG. 2 is exploded view of the various components of the venting device showing their relation to an opening in the sidewall of a railway car.

FIG. 3 is a cross sectional view taken substantially on lines 3—3 of FIG. 2 in assembled position.

FIG. 4 is a perspective view of the receiving or mounting element;

FIG. 5 is an end view with the filter removed;

FIG. 8 is a fragmentary transverse or axial cross-section taken on line 8—8 of FIG. 6 in disassembly;

FIG. 8a shows the part of FIG. 8 in assembled position;

FIG. 9 is a fragmentary cross-section taken on line 9—9 of FIG. 6 showing the unlocked position of the filter;

FIG. 9a is a fragmentary cross-section as in FIG. 9 showing the parts in locked position;

DETAILED DESCRIPTION OF THE INVENTION

Figure 6:
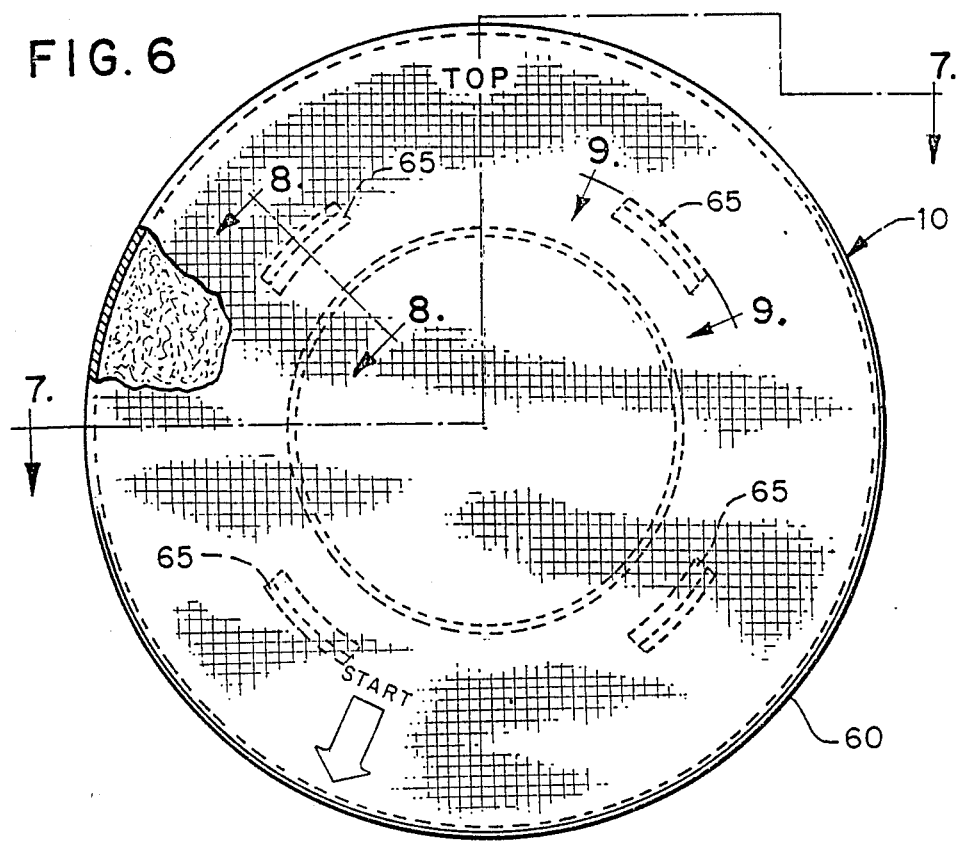
FIG. 6 is an end view of the filter partially broken away.
Figure 7:
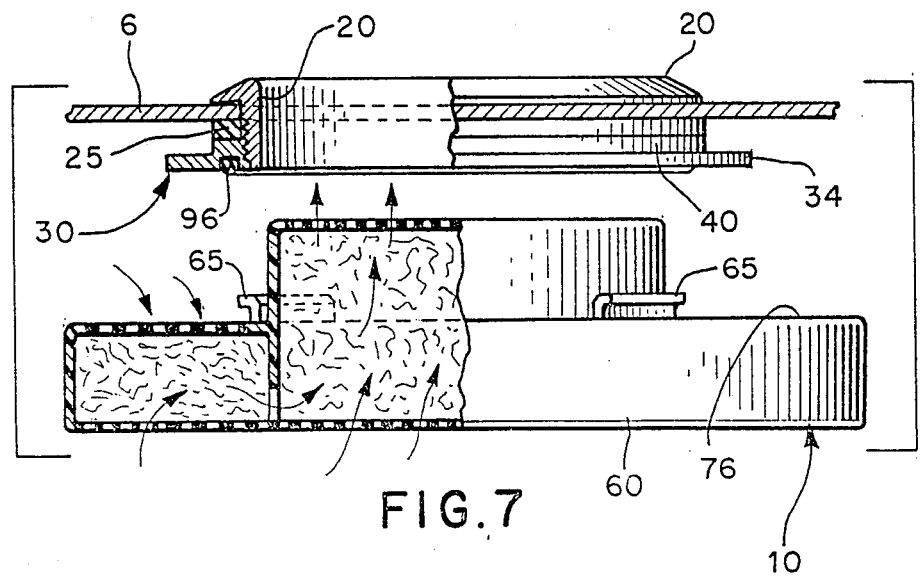
FIG. 7 is a cross-sectional view taken substantially on line 7—7 of FIG. 6.
Figure 10:
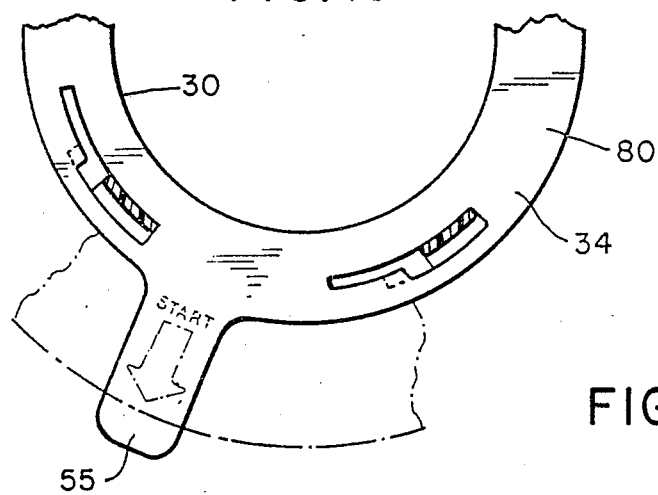
FIG. 10 shows the unlocked position of the nut portion of the assembly.
Figure 10A:
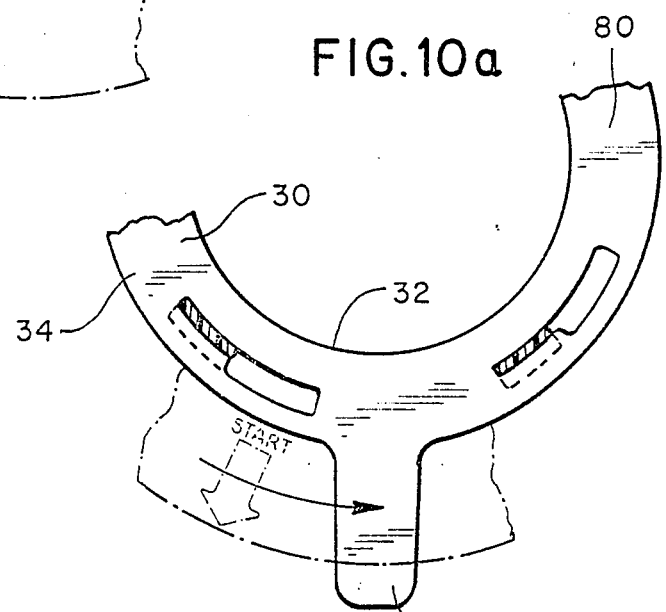
FIG. 10a shows the locked position of the nut.

The invention will now be described in detail by reference to the drawings wherein like numerals refer to like components. FIG. 1 shows a railway car 5 in partial perspective on which the venting device 10 is mounted.

The venting device is shown mounted on an end wall portion 6 of the car 5. The venting device, however, may be mounted on any portion of the car that may be suitable for permitting air to flow through the filter of the venting device. During discharge of lading material from the car 5, particularly during vacuum discharge, air will enter venting device 10 to equalize air pressure between the cavity of the hopper of car 5 on which venting device 10 is mounted and the surrounding atmosphere.

The venting device 10, as shown in FIG. 2, includes a locking or receiving member 30, a mounting or securing member 80 to retain the receiving member and a replaceable filter or cannister element 60 to be mounted on the receiving member. A sealing member 25 may also be included in the venting device. Locking member 30 may be in the general form of a ring or any other configuration suitable for mounting on the sleeve 81 which extends through the opening 20 in the container wall 6. Receiving or locking member 30 includes a hollow ring or hub section 40 that has opening 32. The hub section 40 may have threads 45 adapted to accept threaded sleeve section 82 of the mounting member 80 and telescopes therewith. The threads 40′ thread onto threads 82 of securing sleeve 81 which extends outwardly of wall 15 through opening 20.

Member 30 is configured to fit onto the securing or mounting member 80.

The locking member or flange nut may be made of a vinyl polyner and, as shown in FIG. 2 has an annular peripheral flange 34 formed integral with hub 40.

Flange 34 has variable width slots 35 for receiving projections or hooks 65 of the replaceable filter member 60. In addition, the receiving member has an elongated handle portion 55 for use in securing and removing the mounting member from opening 20.

Securing member 80 includes a sleeve section 81 adapted for insertion through opening 20 and into opening 32 of receiving nut member 30. Securing member 80 may also include an annular outturned flange section 83 on its inner end for engaging the wall portion 16 surrounding opening 20.

The replaceable element 60 of the venting device may be in the form of a hollow filter or cannister having porous section 70 and 75. L-shaped hooks or lugs 65 are provided on the inner wall 76 of replaceable member for mounting on the receiving member 30. The lugs 65 are inserted through the wide portions 36 of slot 35 and by turning the element 60, the projections are entered into the narrow sections 37 and the lip portions 68 of each lug 65 then overlaps or fits behind section 89 of the flange 34.

Figure 11:
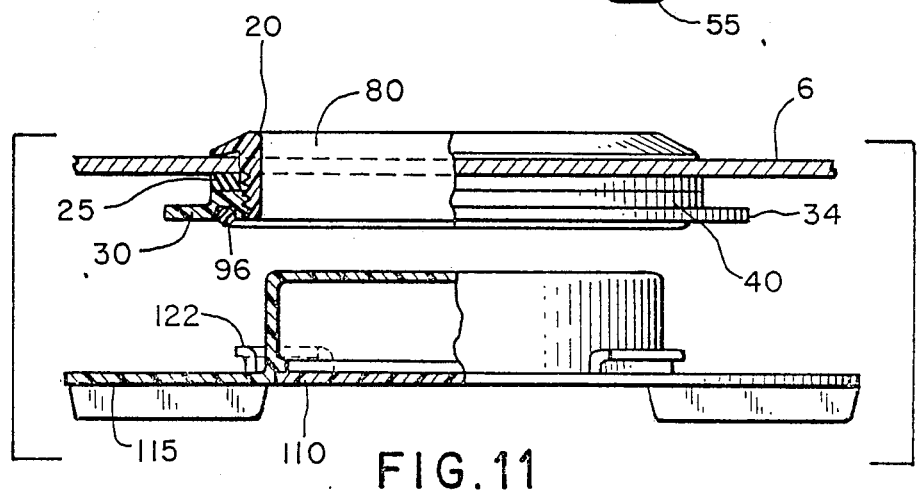
FIG. 11 is a cross section showing a plug entering the mounting assembly.

Alternatively, as shown in FIG. 11 the replaceable filter element 60 may be in the form of a plug 110 to close the opening into the cavity of the container.

As shown in the drawings receiving nut element 30 is threaded on the mounting sleeve element. The replaceable filter element 60 is shown as having a cylindrical plug section 87 inserted into opening or bore 86 of element 30. The L-shaped projections or clips 65 of the replaceable element are shown in FIG. 8a as extending through variable width slots 35 of locking member 30 to releasably secure the replaceable element to the locking member. Slots 35 as previously stated have wide sections 36 at one end connected to narrow sections 37 at the other end. Slots 35 are of arcuate configuration and concentric with opening 32 about the axis thereof. Gasket 25, of vinyl or like material, serves as a sealing member between wall section 16 and the securing member 30. In addition an O-ring member 96, also of vinyl or like sealing material fitted within an annular groove 97 on the external side of hub 40 may also be provided for achieving a tight seal between the replacement elements 10 or 110 and the securing member.

Mounting member 80, as shown in FIGS. 2 and 3, is inserted through wall 16 and into opening 32 whereby threads 82 of the securing member engage the threaded section 40 of the locking member.

In FIG. 11 element 60 is replaced by a plug 110. Which, as shown, may include axial projections or hooks 112 on an outward flange 115 thereof which are entered into the variable width slot 35 on securing nut member. Plug 110 is used to close an empty container to prevent dirt from entering.

During mounting of the venting device into an opening within an enclosed container of a railway hopper car, the mounting element 80 is inserted into the opening 20 from the interior of the cavity so as to project outwardly from the wall 16. A gasket 25 is then placed on the securing member whereafter locking member 30 is threaded onto the securing member to form a tight seal with the wall. The filter is positioned with the L-shaped lugs 65 in the wide portions 36 of the respective slots 35 and turned to enter the narrow position 37 to secure the filter t the securing element. To release the filter it is turned in the opposite direction.

A further feature of the invention is to provide an interlock between the mounting element or filter support structure and the securing element. This is accomplished by providing a series of ratchet teeth or catches 130 on the distal edge of the sleeve 81. These teeth (as seen in FIGS. 2, 4 and 5) have ramp portions 132 which are sloped axially outwardly to permit a radially inwardly projecting flexible tooth catch or lug 136 on the flange portion of the securing nut member to ride over the respective teeth as the securing member is rotated in a counter clockwise direction (FIG. 5) to lock behind a selected tooth 130.

Inasmuch as the lug 136 is flexible axially of the locking member 30 it can be rotated by the handle 55 in a clockwise direction to unthread the member 30 attendant to the lug 136 flexing outwardly and escaping over the teeth.

It will be noted that the ratchet and tooth combination and the flexibility of the teeth 130 and of the locking tooth or lug 136 combination provides a shake-proof locking assembly particularly adapted to railcar use where rapid and continuous vibrations prevail during travel.

The vacuum force of the air being withdrawn from the car causes the inner face of the large cylindrical portion of the filter to tightly abut the outer face of the flange of the nut member thus providing an additional seal.

What is claimed is:

1. A venting device for admitting air into an enclosed container through an opening in a wall therein during discharge of material from said container, said device comprising:

mounting means adapted to be positioned in said opening, retainer means for holding said mounting means on said container, a replaceable filter member adapted to admit air into said container, means for releasably mounting said filter member to said retainer means, and shake proof means for securing said retainer means to said mounting means comprising interengaging teeth means on said retainer means and mounting means, and said teeth means on the retainer means being deflectable away from the teeth means on the mounting means for releasing the same.

2. The device of claim 1 further including a means for forming a seal between said retainer means and said container.

3. The device of claim 1 wherein said replaceable member includes a porous filter for transmitting air through said venting device.

4. The device of claim 1 wherein said retainer means further includes a means for forming a seal between said replaceable filter member and said retainer member.

5. The device of claim 4 wherein said means for forming a seal between said replaceable member and said retainer member is an O-ring.

6. The device of claim 5 wherein the material of said O-ring is vinyl.

7. A venting device for admitting air into an enclosed container through an opening in a wall therein during discharge of material from said container, said device comprising:

mounting means adapted to be positioned in said opening, retainer means for holding said mounting means on said container, a replaceable filter member adapted to admit air into said container, means for releasably mounting said filter member to said retainer means, and shake proof means for securing said retainer means to said mounting means, wherein said means for releasably mounting said replaceable member includes apertures in said retainer means and hook portions on said replaceable member extend through the apetures and rotatable into locking position behind portions of said retainer means.

8. The device of claim 7 wherein said means for retaining said mounting means in said opening includes a section projecting through said opening, and said shakeproof means being located in cooperative relation on said section and said retainer means.

9. The device of claim 7 wherein said retainer means is in the form of a hollow ring having an outwardly projecting flange section for engaging a lateral surface of said container to retain said mounting means in said opening.

10. A railway car having an interior space therein for transport of cargo, said railway car comprising:

a wall member having a vent aperture therethrough communicating with the interior of the car;

a filter support structure supported on the wall member at the aperture;

a filter assembly supported on the filter support structure and covering said aperture, the filter assembly including filter means for filtering air passing through the filter means and through the filter support structure and into the interior space;

the filter support structure and the filter assembly having releasable coating securement means selectively securing and releasing the filter structure in assembly with respect to the filter support structure and comprising circumferentially interlocking means.

11. The invention according to claim 10 and said filter support structure including a threaded portion extending through said aperture, and a securement portion threadingly receiving the threaded portion and holding the threaded portion within the aperture.

12. The invention according to claim 11 and one of said portions of the filter support holding having a ratchet and the other of said portions having a catch means thereon coacting with the ratchet structure to secure the securement portion on the threaded portion.

13. The invention according to claim 10 and said securement means including a flange portion spaced outwardly from the wall member and having a surface generally facing the wall member and;

said securement means including securement latches extending between the flange portion and the wall member and engaging said surface for securing the filter structure with the filter support structure.

14. The invention according to claim 10 and the flange portion having openings therein, and the securement means comprising clip portions each extending through respective openings and engaging said surface.

15. The invention according to claim 14 and the filter means being supported for movement on the filter support structure between a release positon wherein the clip portions are movable through the openings outwardly from the wall structure to release the filter structure, and are movable into a secured position entered within the openings against movement outward of the wall member.

16. The invention according to claim 14 and said filter support structure being movable rotatively in opposite directions between the release secured positions.

17. The invention according to claim 10 and the coacting securement means including lock means for securing the filter structure in the secured position.

18. In a railway car having an enclosed body portion for holding particulate material which upon dumping from said enclosed portion develops a vacuum in the enclosed portion, a vent assembly communicating said body portion with the surrounding atmosphere through an aperture in a wall of said container, said vent assembly comprising a flexible plastic insert having a threaded sleeve extending through said aperture and having a radial flange having an air tight engagement with the interior of said wall about said aperture, a plastic nut element threaded onto said sleeve, a seal ring on said sleeve compressed between the exterior side of said wall and said nut member, said nut member having a peripheral flange with axial slots therein, a filter comprising an axially extended portion having an air tight peripheral fit within said sleeve and having a porous end portion communicating with said body portion and having locking means extending through said slots and engaging said flange, and means for releasably interlocking said nut element and sleeve comprising teeth on said sleeve and cooperating flexible tooth means on said nut element in interlocking engagement with each other.

19. The invention according to claim 18 and said filter comprising an enlarged filter-material-containing portion disposed externally of the nut element, and said nut element having a handle extending radially outwardly of said enlarged filter portion for rotating the nut element and threading and unthreading it with respect to said sleeve.

20. The invention according to claim 19, and said handle in assembled position of the vent assembly with said body portion lying in close proximity to the exterior of the body portion and being flexible axially of the nut element to provide hand access thereto between said body portion and the handle attendant to deflection of the handle away from said body portion.

* * * * *